March 4, 1941.  P. LANDRUM  2,233,539
FLEXIBLE POWER TRANSMISSION
Filed Sept. 14, 1939
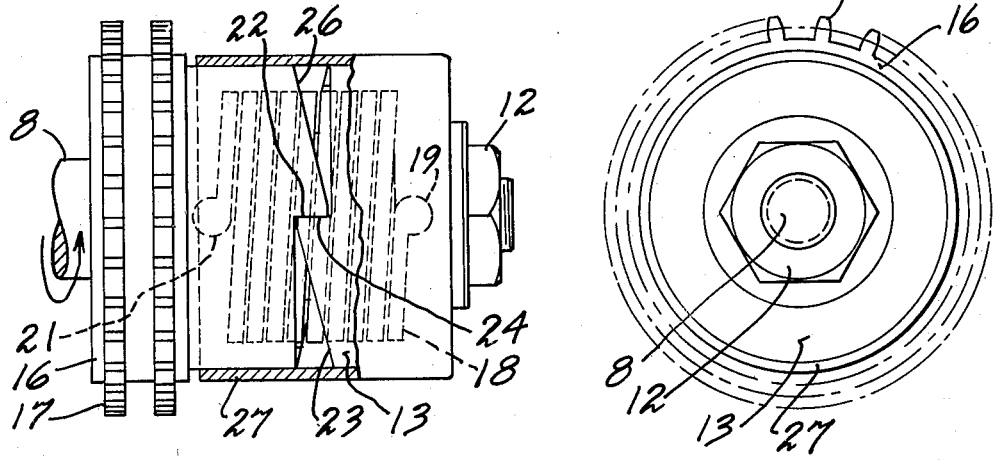
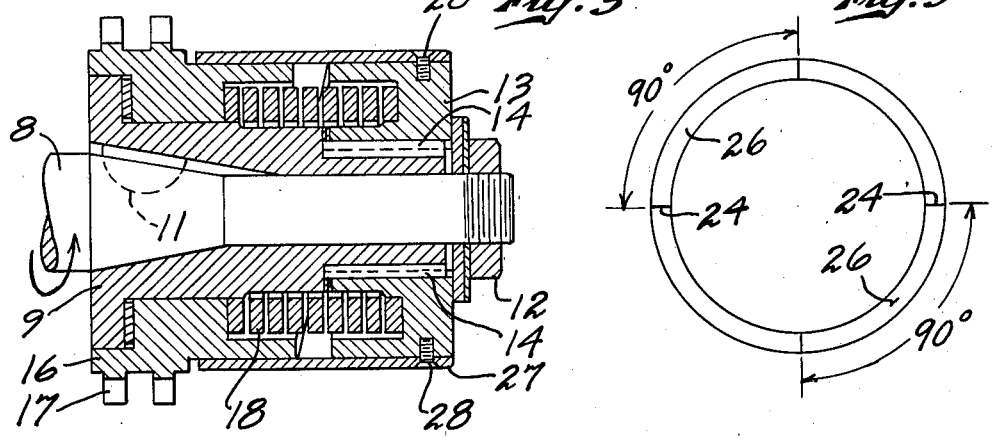
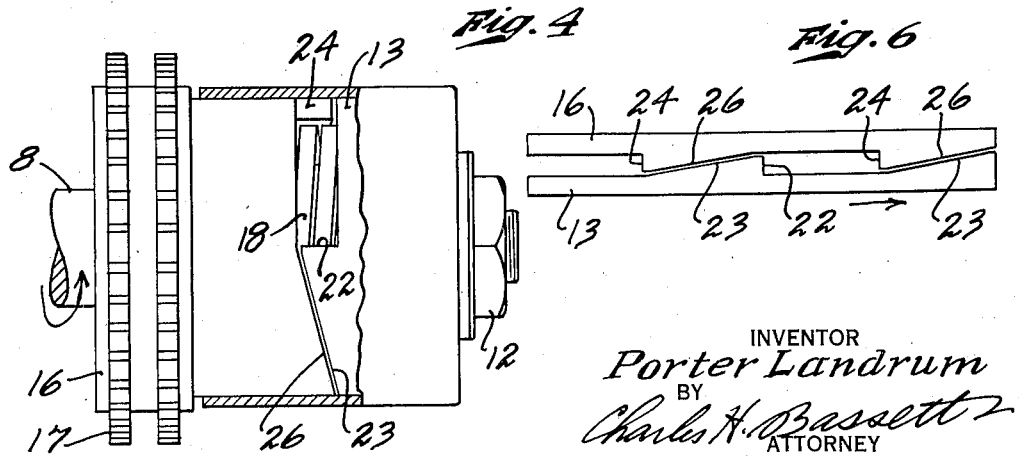
INVENTOR
*Porter Landrum*
BY
*Charles H. Bassett*
ATTORNEY Patented Mar. 4, 1941

2,233,539

UNITED STATES PATENT OFFICE 2,233,539

FLEXIBLE POWER TRANSMISSION

Porter Landrum, Birmingham, Ala.

Application September 14, 1939, Serial No. 294,878

3 Claims. (Cl. 64—27)

My invention relates to a flexible power transmission and has for an object the provision of a device of this kind adapted for use with internal combustion engines to provide a more uniform flow of power from the engine to the point of use.

My invention further contemplates the provision of a flexible power transmission employing a helical spring through which the power is transmitted and uniformly transmitted to the point of use together with suitable stop means to limit the relative rotational movement of the driving and driven members which engage the ends of the spring.

My invention embodies other novel features, details of construction and arrangement of parts which are hereinafter set forth in the specification and claims and illustrated in the accompanying drawing, forming part thereof, wherein:

Fig. 1 is a side elevational view showing my improved flexible power transmission, partly broken away for the purpose of clear illustration;

Fig. 2 is an end view of same;

Fig. 3 is a sectional view of same;

Fig. 4 is a side elevational view, partly broken away, showing the cam stop members in engagement;

Fig. 5 is an end view showing the face of the driven member and the disposition of the stop members thereon; and Fig. 6 is a diagrammatic view showing the stop members.

Referring now to the drawing for a better understanding of my invention, I show a flexible power transmission comprising a shaft 8 having a collar 9 secured thereon by means of a key 11 and a nut 12. A driving member 13 is mounted on the collar 9 and held against relative rotational movement therewith by means of keys 14. A driven member 16 provided with sprocket teeth 17 is journaled for rotation on the collar 9.

A helical spring 18 is positioned between the driving member 13 and the driven member 16 and has its one end secured in a socket 19 formed in the driving member and its other end secured in a socket 21 formed in the driven member. Stop shoulders 22 and wedge surfaces 23 are formed on the driving member 13. Stop shoulders 24 and wedge surfaces 26 are formed on the driven member 16. A sleeve 27 is secured on the driving member 13 by means of screws 28 to enclose the driving and driven members.

When power is not being transmitted through the transmission the wedge surfaces 23 and 26 are in engagement with each other, as illustrated in Fig. 4 in the drawing, due to an initial tension placed upon the spring 18 when the transmission is being assembled. When power is being transmitted through the transmission the wedge surfaces 23 and 26 move out of engagement causing the spring to carry the load from the driving member to the driven member. When the load being transmitted is greater than the resistance offered by the spring the stop shoulders 22 and 24 are brought into engagement to provide a positive drive.

The power transmission shown and described is particularly designed for use with internal combustion engines and more particularly for use on motorcycles. It has been observed that the use of this power transmission on motorcycles overcomes the usual fuel knocks as it permits the pistons to move downwardly more rapidly at the beginning of the firing strokes. It has also been observed that an increase in power is obtained through the use of this transmission on motorcycles. The driving member and the driven member are limited to a relative movement of ninety degrees for use on motorcycles as this movement has been found to be the most satisfactory, but other limits of relative movement may be found more satisfactory when the power transmission is employed with other sources of power.

While I have shown my invention in but one form it is obvious to those skilled in the art that it is not so limited but is susceptible of various changes and modifications without departing from the spirit thereof; and I desire, therefore, that only such limitations shall be placed thereupon as are imposed by the prior art.

I claim:

1. In a power transmission, a driving member, a driven member journaled for rotational movement with respect to the driving member, a helical spring having its one end secured to the driving member and its other end secured to the driven member, a stop shoulder formed on the driving member, a stop shoulder formed on the driven member for engagement by the stop shoulder on the driving member when the power being transmitted is greater than the resistance offered by the spring, a wedge surface formed on the driving member, a wedge surface formed on the driven member for engagement with the wedge surface on the driving member when power is not being transmitted through the spring.

2. A device according to claim 1 in which the stop shoulders and wedge surfaces are disposed on opposing faces of the driving member and the driven member.

3. A device according to claim 1 in which, the stop shoulders and wedge surfaces serve to limit the relative rotational movement of the driving member and the driven member to approximately ninety degrees.

PORTER LANDRUM.